United States Patent [19]

Von Loesch et al.

[11] Patent Number: 4,801,267
[45] Date of Patent: Jan. 31, 1989

[54] DISPLAY DEVICE FOR ILLUSTRATING COLOR MIXTURES

[76] Inventors: Hans Von Loesch, Waldfriedstrasse 24, D-6000 Franfurt/Main 1; Harald Riehle, Gottlieb-Wolfer-Strasse 6, D-7306 Denkendorf, both of Fed. Rep. of Germany

[21] Appl. No.: 57,900
[22] PCT Filed: Oct. 16, 1986
[86] PCT No.: PCT/EP86/00592
 § 371 Date: May 29, 1987
 § 102(e) Date: May 29, 1987
[87] PCT Pub. No.: WO87/02767
 PCT Pub. Date: May 7, 1987

[30] Foreign Application Priority Data

Oct. 22, 1985 [DE] Fed. Rep. of Germany ... 8529913[U]
Oct. 25, 1985 [DE] Fed. Rep. of Germany ....... 3537990
Jul. 3, 1986 [DE] Fed. Rep. of Germany ..... 86109058

[51] Int. Cl.⁴ .......................... G09F 9/00; G09F 11/00
[52] U.S. Cl. ...................................... 434/104; 434/101
[58] Field of Search ................................. 434/101, 104

[56] References Cited

U.S. PATENT DOCUMENTS

| | | | |
|---|---|---|---|
| 1,840,208 | 1/1932 | Osborn | 434/104 |
| 2,238,316 | 4/1941 | Gaugler | 434/104 |
| 2,240,053 | 4/1941 | Richardson | |
| 2,522,723 | 9/1950 | Rookyard | |
| 2,988,824 | 6/1961 | Morton | 434/104 |
| 3,184,864 | 5/1965 | Johnson | 434/104 |
| 4,310,314 | 1/1982 | Worn et al. | 434/101 |
| 4,594,070 | 6/1986 | Stoddard | 434/104 |

FOREIGN PATENT DOCUMENTS 123819 9/1901 Fed. Rep. of Germany.
568995 1/1933 Fed. Rep. of Germany.
1262148 2/1968 Fed. Rep. of Germany.

Primary Examiner—Larry Jones
Attorney, Agent, or Firm—Jones, Tullar & Cooper

[57] ABSTRACT

In a display device for illustrating color mixtures, one color each in various intensities is printed on various transparent color wheels. The color wheels are concentric with respect to one another and are individually rotatable. Along their circumference, they are each provided with a tab for adjustment. The color imprint on a color wheel is provided in gradations of increasing or decreasing intensity along the outer circumference of the color wheel. The color wheels are covered with a covering wheel of non-transparent material, which has a recess for observation of the color mixture obtained by adjusting the color wheels. A scale which is associated with the rotational position of the color wheels is disposed on the covering wheel.

15 Claims, 5 Drawing Sheets

DISPLAY DEVICE FOR ILLUSTRATING COLOR MIXTURES

BACKGROUND OF THE INVENTION

The invention relates to a display device for illustrating color mixtures, in which various transparent color wheels, each having one color printed on it in various intensities, are disposed concentrically with one another and individually rotatably and are each provided along their circumference with a tab for adjustment.

A display device of this kind is known from German Pat. No. 568 995. According to the exemplary embodiment of FIGS. 1–4 of this publication, it is known to displace a plurality of color wheels, printed in various colors, relative to one another in such a way that various mixtures of the colors are produced. Each of these color wheels is embodied such that it is printed with a certain color, but in various intensities. The various intensities produce a certain pattern on each color wheel. However, these patterns are different from one color wheel to another. When the wheels are displaced, there is no systematic contribution made by the individual color ingredients, dependent for instance on the extent of displacement, in the color mixture attained. The appearance of various color mixtures as the color wheels are displaced relative to one another instead appears to occur relatively arbitrarily in succession with one another. Thus with this device it is not possible to rapidly and systematically display a color mixture that can be associated with predetermined percentages (per cent with respect to the color intensity) of the individual colors used for the mixture. Conversely, it is also not possible with a predetermined color mixture to discover with which degree of intensity (from 0 to 100%) the individual color components have contributed to this mixture. Furthermore, because of the spatial disposition of a predetermined point having a predetermined color mixture inside all of the panels, it would be difficult to compare a color mixture just being produced at a predetermined point inside the color wheel with a predetermined color, for instance on a printed piece of advertising material. The exemplary embodiment of FIG. 5 of this publication now shows that such color wheels can be glued in in the form of circular-segmental sections of circular panels, so that the displacement of the color wheels relative to one another is done by rotation of the concentric panels relative to one another, which for rotation are also provided with tabs that protrude on the outer rim. Here again, however, the disadvantage is still that the dispositions of the regions of various color intensity on each color wheel is not systematic, so that from the rotational position of the individual color wheels no conclusion can be drawn as to which color intensity of each of the colors used of the individual color wheels has participated in a color mixture. Furthermore, a color mixture occurs at a predetermined point inside the circular segment, and it is extraordinarily difficult then to compare this point precisely with a point on a printed document or the like.

In U.S. Pat. No. 2,522,723, a plurality of color wheels are disposed, each being rotatable about different axes of rotation, in a box-like housing. The circumferential surface is divided into circular segments, and each wheel is printed each with one color in gradations from one circular segment to another with decreasing or increasing intensity of the colors. At one point, the outer edges of all four wheels overlap. At a predetermined rotational position, a predetermined color mixture is then produced; thus from the rotational position of the wheels it is apparent which intensity of each of the color wheels used is a component in the resultant color mixture. However, this device is not suitable for a desired comparison of the color mixture produced with a colored portion of advertising or some printed product, for ascertaining the same color mixture or one that matches it, because the device has a very tall structure; this is also necessary, because a special stamping mechanism is provided so that after adjustment, the color wheels resting one over the other at the special point mentioned can be pressed against an observation-proof window. Furthermore, in the preparation of color mixtures it is disadvantageous that to this end the individual color wheels have to be printed with the individual colors in different intensity in very complicated patterns, so that when they overlap the individual grid points will coincide exactly. In the arrangement according to U.S. Pat. No. 2,522,723, color interferences would be produced if the device were used in halftone printing. Finally, another disadvantage of this arrangement is that the point at which the color mixture is produced is located in the center; that is, it cannot be displaced on a printed document in such a way that the color mixture arrived at can be placed directly next to a particular already-existing color for comparison purposes.

SUMMARY OF THE INVENTION

It is the object of the present invention to further develop a display device of the above type such that arbitrary color mixtures can be produced by relative rotation of the concentrically arranged color wheel with respect to one another, such that in a particularly simple manner, with a predetermined color mixture, it can be read out at one point of the superposition of the color wheels, with which intensity each of the colors has contributed to this mixture, and furthermore, to be able to make this position of the color mixture available at a position in or on the display device such that by this means a comparison with a color on the printed document can be made easily and precisely.

In accordance with the invention, this object is attained in that the color wheels are colored in the radial direction only over a predetermined region, and furthermore in that an adjoining region in the radial direction is not colored and that a recess next to the color region also includes a portion of the non-colored region.

A particularly advantageous feature as compared with German Pat. No. 568 995 described above is that the pattern of the regions of various intensity of one color on a color wheel are disposed in such a way that it is particularly easy to read out with which intensity the color of a color wheel is contributing to the mixture or contributes as a component to this color mixture. This color mixture is produced at a point on the edge of the entire arrangement embodied by the wheels, so that this point on the rim can easily be laid on a printed document and there compared with a particular printed area, for example to see whether it matches or to see what impression the two colors make in cooperation with one another. In this way, this arrangement differs particularly from the arrangement of U.S. Pat. No. 2,522,723.

The invention also relates to various advantageous further developments. Among these, it can be particularly emphasized that the color wheels are preferably embodied such that in the region of the recess in which the color mixture becomes visible, a region is produced that is colorless, or in other words that merely produces—on an underlay—a falsification or change in the impression of the observed point of a kind such as that caused solely by the unprinted transparent color or by the plurality of color wheels superimposed on one another, so that by this means, in direct comparison located one beside the other, the absorption or optionally also falsification of the color impression of an underlay is compensated for by the backing material of the color wheels at the point at which the color mixture is located.

A further particularly advantageous further development provides that behind the recess of the covering wheel through which the desired color mixture is observed, a flap of soft plastic material can be pivoted into place, so that the color can be evaluated as such, that is, without also observing the background beneath it.

BRIEF DESCRIPTION OF THE DRAWINGS

An exemplary embodiment of the invention is described below, referring to the accompanying drawings. Shown are:

FIG. 3a, a plan view of a wheel 1;

FIG. 3b, a section along the line 3b—3b in FIG. 3a; and

DETAILED DESCRIPTION

Figure 1:
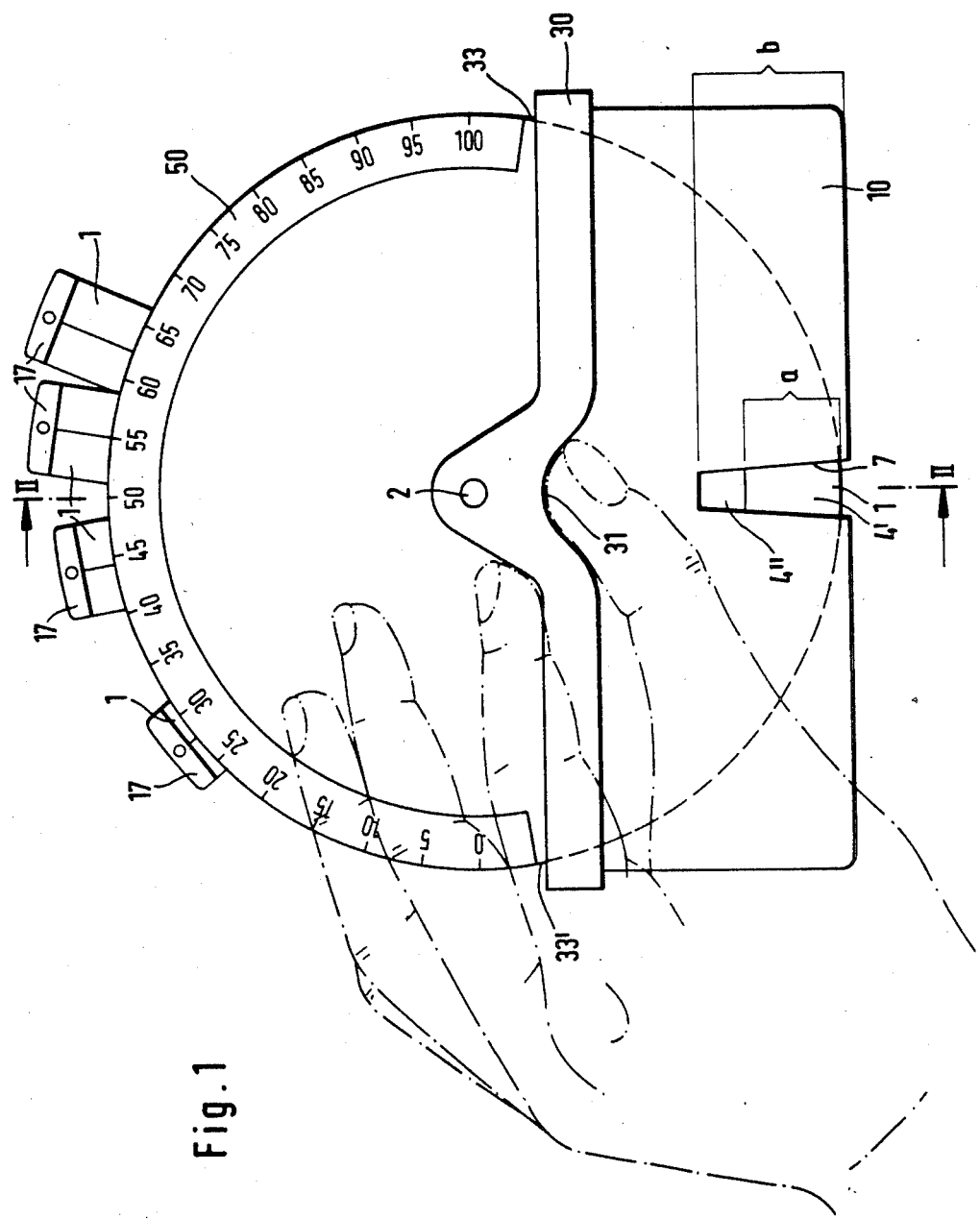
FIG. 1, a plan view of the display device.

The exemplary embodiment is embodied by a plurality of color wheels. They are embodied by a backing foil 1 and color foil 4. Paper wheels 14 are disposed between the color wheels 1, 4. The entire wheel arrangement 5 is covered on both sides for covering purposes each with a respective further covering wheel 6 or 10. Extending through the center of the wheels is a rivet 2, about which the color wheels 1, 4 are rotatable. The backing foils 1 are provided on the circumference with tabs 17, and the tabs are provided handle strips 32, so that they can be rotated independently of one another and counter to one another.

Figure 3:
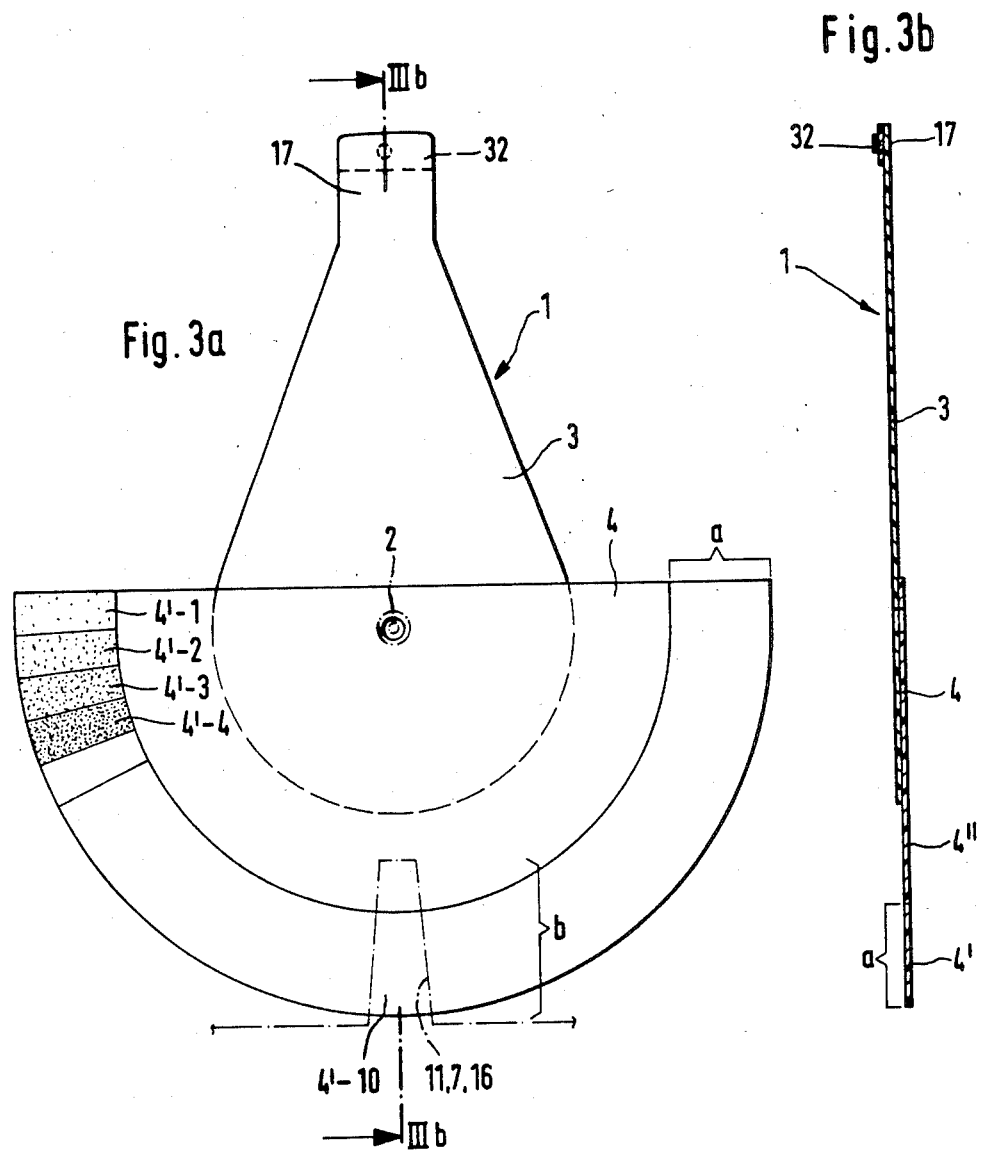

As shown in FIG. 3b, the color foil 4 is supplied to the backing foil 1. The backing foil 1 is relatively sturdy; the color foil 4 is thinner and is approximately semicircular in shape. It is printed in the region 4' with 20 viewing fields 4'-1, 4'-2, . . . , 4'-20. The viewing fields 4' are each printed for each wheel 1 with a particular color in various color gradations, and for instance in halftone printing the density of dots increases by 5% at a time from one viewing field to another, so that with 20 fields a color having a total mixture contribution of from 0 to 100% is available. The four wheels 1 are each printed with different colors, namely yellow, red, blue, and grey in the various color gradations. By adjusting the color wheels 1, 4 relative to one another, an arbitrary color mixture of these four colors can be adjusted at a particular point. "Arbitrary" means that the individual colors may each contribute to the color mixture with an intensity varying from 0 to 100%.

The covering wheels 6 and 10, which cover the wheel arrangement 5 on both sides, have recesses 7 and 11, respectively, the location of which is shown in dashed lines in FIG. 3a with respect to a color wheel 1, so that the color mixture produced can be observed through the recesses 7 and 11, as well as through corresponding recesses 16 in the paper wheels 14.

The color foils are not printed along their entire extension in the radial direction that becomes visible in the recesses 7, 11, but rather only along a portion 4', which radially encompasses the distance a. The distance a is smaller than the distance b. The distance b designates the entire extension radially of the recesses 7, 11. As a result, in the recess 7, 11 (and 16) the color mixture attained by the various representation of the color wheels 1 can be observed only in the region 4', while in the region 4" next to it, the transparent backing foils 4 that are not printed with color can be observed. Thus in the recesses 7, 11 the color wheels and hence their mixture, and the backing foils not printed with color can be observed next to one another and superimposed on each other. Immediately adjacent the field 4' produced by color mixture, a field 4" appears with colorless foils 4' showing through, without a color overlay.

If on a particular colored background one wishes to observe a certain color and prepare a color mixture matching it using the color wheels 1, then one observes it through the colored foils 4, first with and then without the color overlay, so that in a comparative observation the color falsification and/or color absorption caused by the transparent color foils is compensated for. In making comparative obserations, the color mixture produced by means of the color wheels 1 is thus prevented from being affected in observation by the (undesirable) inherent coloring or color absorption of the material from which the colored foils are made.

Figure 2:
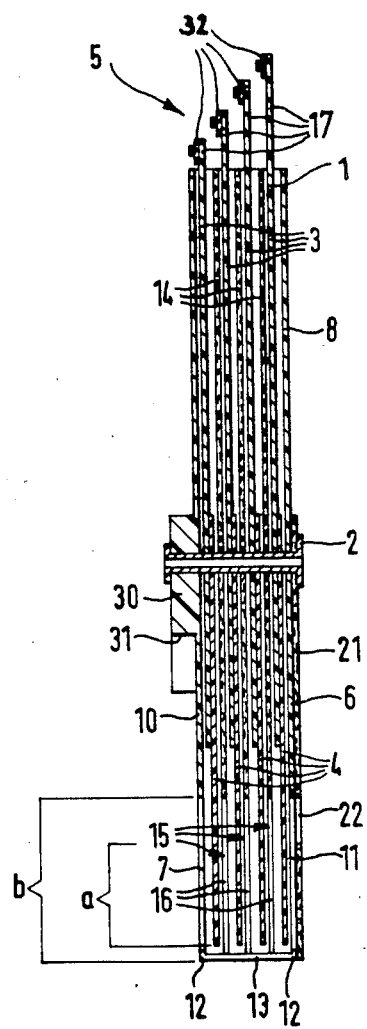
FIG. 2, a section taken along the line II—II of FIG. 1.
Figure 4:
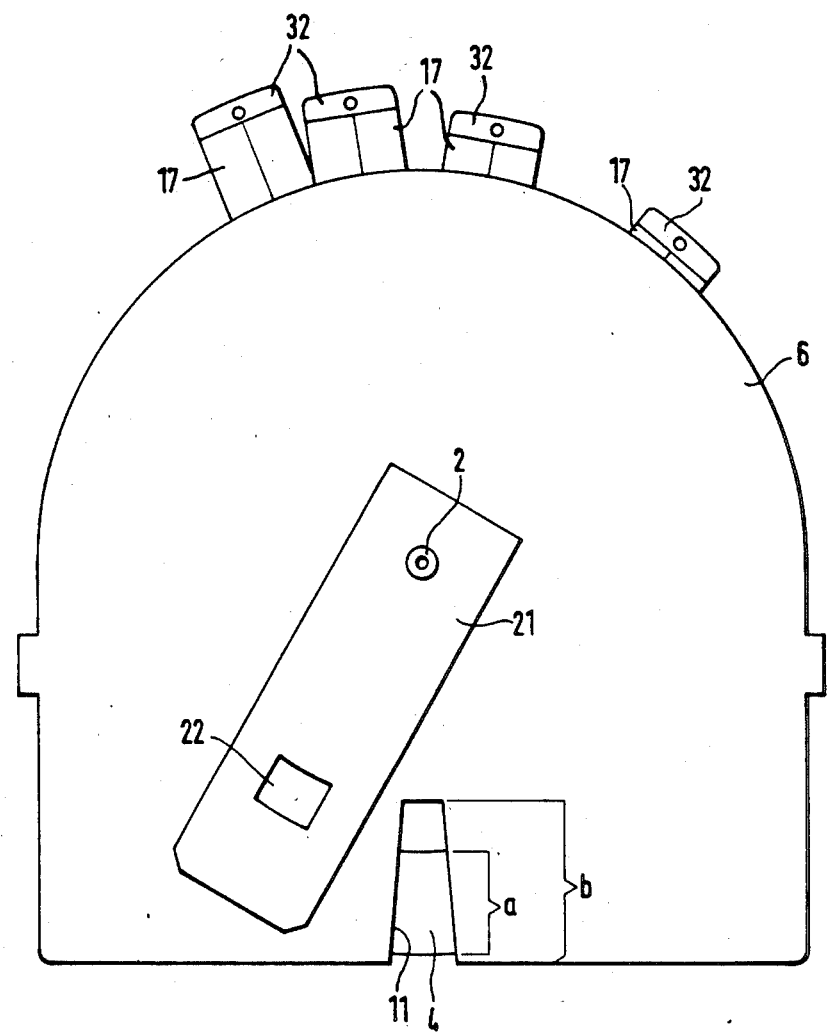
FIG. 4, a back view of the display device.

A plate 21 is attached to the backside of the color wheels, on the wheel 6. It is likewise pivotable about the rivet 2. It has a window 22. If it is pivoted to in front of the recess 7, 11 (that is, from the position shown in FIG. 4 into a vertical position), then when observed from the front (from the left in FIG. 2) it covers the region 4' printed with color of the color foils 4 from behind. If the plate 21 itself is of pure white material, then the covering of the colored printing of the colored foils 4 is thus covered in pure white from behind. Additionally, the recesses 7, 11 remain visible through the window 22, so that an arbitrary color background can be observed through the regions not printed with a color overlay of the foils 4. Additional color foils for additive mixing can be inserted behind the plate 21.

A handle strip 30 is attached to the front wheel 6, which is used for covering the color wheels. As indicated by the hand drawn in dashed lines, the entire display device can thus be held securely in the hand and easily guided on a background, even with color nuances, the thumb engaging the depression 31. The symmetrical embodiment makes it possible for both right-handed and left-handed persons to manipulate it equally well.

The tabs 17 are provided with handle elements 32. As a result, the color wheels 1, 4 lying flat on the surface to be evaluated can be easily rotated with the fingertips. The location of the tabs 17 is matched to a scale 50 in such a way that the position of a tab on the scale indicates with which color gradation this color participates as a component in the color mixture in the recess 7, 11.

The covering wheels 6 and 10, which cover the color wheels on both sides, are joined together along the outer edge, approximately up to the points indicated at 33 and 33'. These connecting points represent a stop for the tabs 17, so that the rotatable color wheels 1, 4 can be rotated only within a semicircle. In addition, the display device according to the invention can be further developed such that the color wheels 4 are interchangeable. The covering wheels 6 and 10 are joined by ribs 13 along their edges 12.

The uppermost covering wheel 6 must have a matte black coloring in the vicinity of the recesses 11, so that the color field in the recess 7, 11 can be evaluated as neutrally as possible and with as little blooming as possible.

Figure 5:
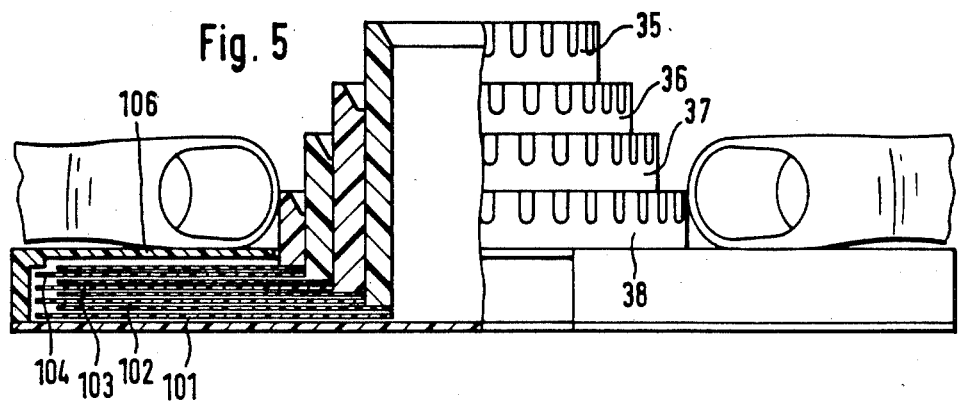
Figure 6:
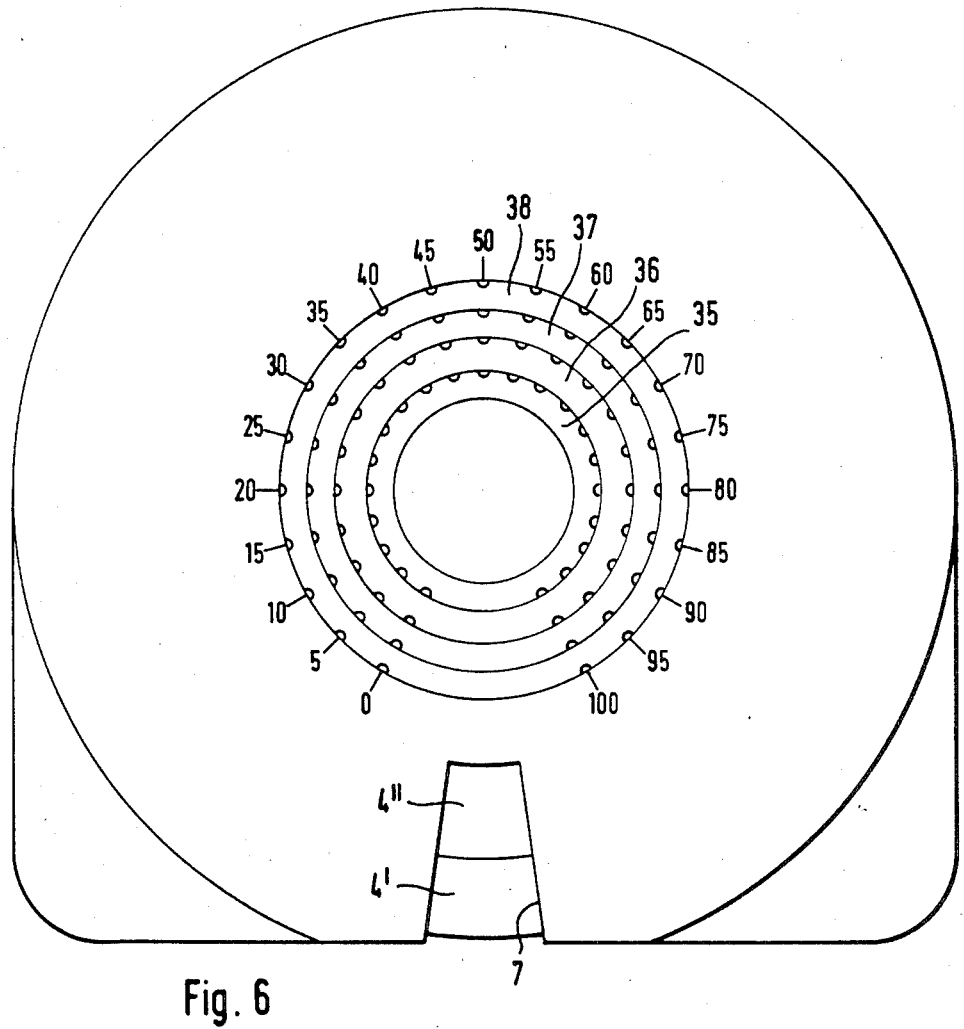

FIGS. 5 and 6 show a further exemplary embodiment, in cross section (FIG. 5) and in plan view (FIG. 6), in which the color wheels 101, 102, 103, 104 are provided in the middle with hubs 35, 36, 37, 38, which are each of different heights and are matched to one another with their inside diameters such that they can be inserted into one another. The wheels can be rotated relative to one another by grasping the hubs from outside and rotating them individually relative to one another. The covering of the entire wheel arrangement at the top is effected via an upper covering wheel 106.

We claim:

1. A display device for illustrating color mixtures, comprising:
    a plurality of concentrically arranged, transparent color wheels each having a color printed thereon of varying gradation, and means for rotating the color wheel in assembly;
    a covering wheel of non-transparent material for covering the cover wheels in assembly said covering wheel having a recess;
    means for mounting the plurality of color wheels and the covering wheel together for rotation of the color wheels relative to each other and the covering wheel; and
    a scale disposed on the covering wheel, said scale being associated with the rotated position and consequently a given color gradation of each color wheel; wherein:
        (a) each color gradation on each color wheel has a radial extent less than the total radial extent of the wheel;
        (b) the recess has a radial extent greater than the radial extent of the color gradations, so that the color gradations and an uncolored region adjacent thereto of each color wheel can be viewed through the recess; and
        (c) said recess thereby serving for viewing any mixture of color gradations of the color wheels obtained by adjustment of the color wheels by said rotating means, in contrast to the adjacent uncolored regions.

2. The display device as defined in claim 1, further wherein:
    (d) each color gradation forms a circular sector on the color wheel, each sector being of different color intensity.

3. The display device as defined in claim 2, further wherein:
    (e) the color intensity between adjacent sectors varies by approximately 5%.

4. The display device as defined in claim 1 further wherein:
    (d) the color wheels comprise a color wheel with yellow color gradations, a wheel with red color gradations, a wheel with blue color gradations, and a wheel with blue color gradations, and a wheel with grey color gradations.

5. The display device as defined in claim 4, further wherein:
    (c) each color gradation on each color wheel forms a circular sector on the color wheel, each sector being of different color intensity.

6. The display device as defined in claim 5, further wherein:
    (f) the color intensity between adjacent sectors on each color wheel varies by approximately 5%.

7. The display device as defined in claim 1, further comprising:
    a paper wheel situated between adjacent color wheels and maintained by said mounting means against relative rotation.

8. The display device as defined in claim 1, further comprising:
    a further covering wheel, said further covering wheel having a recess and dimensions similar to those of said covering wheel; and
    means for joining the further covering wheel and said covering wheel laterally of the recesses.

9. The display device as defined in claim 8, further comprising:
    a plate rotatably mounted to the further covering wheel.

10. The display device as defined in claim 9, further wherein:
    (d) the plate is provided with a window; and
    (e) in one pivoted position of said plate the window provides a view of the uncolored adjacent regions of the color wheels, while covering the color gradations of the color wheels from view from the further covering wheel, said color gradations still being viewable through the recess in said covering wheel.

11. The display device as defined in claim 1, further comprising:
    a strip-like handle provided on said covering wheel.

12. The display device as defined in claim 11, further wherein:
    (d) the strip-like handle is symmetrical and includes a depression for use in manual rotation of the strip-like handle.

13. The display device as defined in claim 1 further wherein:
    (d) the means for rotating the color wheels comprise a tab formed on each color wheel, each tab having a handle element for use in manual rotation of the color wheel.

14. The display device as defined in claim 1, further wherein:
    (d) said covering wheel is provided with a matte black coloring in the vicinity of its recess.

15. The display device as defined in claim 1 further wherein:
    (d) the means for rotating the color wheels comprises as control hub; and
    (e) the hubs of each color wheel are of different height and diameter such that in assembly the hubs fit concentrically relative to each other.

* * * * *